United States Patent [19]

Courval

[11] Patent Number: 5,169,587
[45] Date of Patent: Dec. 8, 1992

[54] PROCESS FOR EXTRUDING LARGE ORIENTED POLYMER SHAPES

[75] Inventor: Gregory J. Courval, Napanee, Canada

[73] Assignee: Symplastics Limited, Ontario, Canada

[21] Appl. No.: 715,465

[22] Filed: Jun. 14, 1991

Related U.S. Application Data

[63] Continuation-in-part of Ser. No. 538,889, Jun. 15, 1990, abandoned.

[51] Int. Cl.⁵ ............................................. B29C 47/82
[52] U.S. Cl. ................................ 264/323; 264/331.17
[58] Field of Search ................... 264/40.6, 323, 331.17

[56] References Cited

U.S. PATENT DOCUMENTS

| | | |
|---|---|---|
| 3,887,319 | 6/1975 | Cottingham . |
| 3,954,372 | 5/1976 | Murray . |
| 4,145,175 | 3/1979 | Groff et al. ........................ 425/377 |
| 4,225,547 | 9/1980 | Okita .............................. 264/323 X |
| 4,266,919 | 5/1981 | Dunnington et al. .............. 425/102 |
| 4,820,466 | 4/1989 | Zachariades ........................ 264/119 |
| 4,938,913 | 7/1990 | Ward et al. ...................... 264/323 X |

FOREIGN PATENT DOCUMENTS

| | | |
|---|---|---|
| 1311885 | 3/1973 | United Kingdom . |
| 1480479 | 7/1977 | United Kingdom . |
| 2052357 | 1/1981 | United Kingdom . |

OTHER PUBLICATIONS

Bigg, Polymer Engineering and Science, vol. 28, pp. 830-841 (1988).
Kolbeck & Uhlmann, Journal of Polymer Science; Polymer Physics Edition, vol. 15, pp. 27-42 (1977).
Imada et al., Journal of Materials Science, vol. 6, pp. 537-546 (1971).
Farrell & Keller, Journal of Materials Science, vol. 12, pp. 966-974 (1977).
Shimada, et al., Journal of Applied Polymer Science, vol. 26, pp. 1306-1326 (1981).
Coates and Ward, Polymer, vol. 20, pp. 1553-1560 (1979).

*Primary Examiner*—Leo B. Tentoni
*Attorney, Agent, or Firm*—Fitzpatrick, Cella, Harper & Scinto

[57] ABSTRACT

In a solid state extrusion process a semi-crystalline polymer billet in a pressure chamber is forced through a die at the end of the chamber, with the polymer passing through the die at a temperature between 30° C. below the alpha-crystalline temperature and the melting point of the polymer to form an oriented polymer profile. The pressure chamber is heated to about 0.50–0.95 of the melting point of the polymer and the die is heated to about 0.65–1.2 of the melting point of the polymer, with the die preferably being heated to at least 5° C. warmer than the billet. A haul off stress on the profile extruded from the die is maintained between at least 0.5 MPa and a maximum amount without plastic deformation of the extrudate to obtain an oriented profile having a cross-sectional area greater than 0.5 cm² at an extrusion rate greater than 0.5 m/min.

19 Claims, 1 Drawing Sheet

PROCESS FOR EXTRUDING LARGE ORIENTED POLYMER SHAPES

CROSS-REFERENCES TO RELATED APPLICATIONS

This application is a continuation-in-part of Ser. No. 07/538,889, filed Jun. 15, 1990 now abandoned.

BACKGROUND OF THE INVENTION

1. Field of the Invention

This invention relates to a solid-state deformation process, and more particularly to a process for solid-state extrusion of thermoplastic polymer billets into oriented large extruded shapes at high extrusion rates.

Most polymers have a chain of carbon to carbon bonds along their backbone. Upon solidification of some polymers, a portion of the polymer chains in the material are folded to form crystals which are randomly oriented within the material. If even a small portion of the material behaves in this manner, the material is referred to as semi-crystalline. Such material may deform easily by bending, sliding and breaking of the crystals or a small fraction of the non-crystalline entangled molecular chains If the chains are aligned or oriented, the mechanical strength is much improved. It is known that properties such as strength and stiffness are enhanced by aligning or orienting the polymer chains. One technique for orienting some polymers, such as polyethylene, is by plastic flow at temperatures below the melting point.

Processes for the solid state deformation of polymers are well known. Among the processing techniques used to make profiles of polymers are ram and hydrostatic extrusion. In ram extrusion the billet of polymer is placed inside a usually cylindrical pressure chamber, so that the surface of the billet is in immediate contact with the walls of the chamber. One end of the chamber is fitted with a die, whose opening corresponds to the profile it is desired to produce. The other end of the pressure chamber is closed by an axially mobile ram, attached to a hydraulic system, so arranged that the ram pushes against the billet of the polymer and forces the polymer out from the chamber by flowing through the die.

In hydrostatic extrusion on the other hand, the billet is much smaller than the pressure chamber, and the surface is separated by some distance from the chamber wall. The intervening space is filled with a hydraulic fluid. One end of the chamber is fitted with a pressure generating device, which may be a piston, or by an inlet through which hydraulic fluid is pumped into the chamber. The other end of the chamber is fitted with the die. One end of the billet is machined in such a way that the nose piece fits into the throat of the die, and makes a liquid tight seal. During extrusion, the pressure on the hydraulic fluid is increased. This pressure is transmitted in both the axial direction and the radial direction to the billet, so that it is pressurized equally in all directions. As a consequence, the surface of the billet is in contact with the oil, and some of this oil adheres to the surface of the billet as it passes through the die, providing a significant amount of lubrication.

During solid state deformation processes such as rolling, drawing and extrusion, the polymers typically lose the spherulitic morphology generated during cooling from the molten state, and become fibrillar with fibrils and these become oriented in a longitudinal direction. The orientation of the polymer in the longitudinal direction increases the mechanical properties of the polymer, e.g. its tensile strength and its tensile modulus. These are sought after properties.

2. Description of the Related Art

Various prior workers have extruded semi-crystalline polymers by the ram extrusion method. For instance, Kolbeck and Uhlman, Journal of Polymer Science: Polymer Physics Edition, Vol 15, 27–42 (1977), disclose the ram extrusion of semicrystalline polymers to produce up to 0.60 cm diameter rod and 1.14 cm wide by 0.04–0.13 cm thick sheet, at draw ratios from 9 to 36. However, the rate of ram advance in all instances was 0.34 cm/min which translates into a maximum extrusion speed of only 12 cm/min.

Imada et al, Journal of Materials Science Volume 6, 537–546 (1971) disclose the ram extrusion of high density polyethylene into thin rods from 2 to 4.5 mm diameter, from a billet of 9.9 mm in diameter to give a maximum draw ratio of 12.5, at an unreported speed.

Farrell and Keller, Journal of Materials Science Vol. 12, 966–974 (1977), disclose a ram extrusion process in which high density polyethylene was extruded into a 5 mm diameter fibre, at a haul off tension of 1 kg. The ram speed varied from 0.005 to 2.0 cm/min, which at the maximum draw ratio of 20 which was used translates into extrusion speeds up to 40 cm/min.

Bigg, Polymer Engineering and Science, Volume 28, 830–841 (1988) states that ram extrusion is very slow, and is limited to low molecular weight polymers. He also discloses that extrusion rates of only 2.5 mm/min have been reported for high density polyethylene extruded at an extrusion ratio of 40:1. Attempts to extrude at higher rates resulted in process instabilities.

Otto and Hower in GB Patent 2052357, disclose a method for ram extrusion, but the material extruded is a powder, and the extrudate is forced through the bore in which the ram travels and not through a die at a high draw ratio to produce oriented polymer profiles.

Dunnington et al in U.S. Pat. No. 4,266,919 disclose a rapid extrusion of polymer profiles ranging from 9.5 to 15.9 mm diameter at 40 cm/min, using a ram whose surface is made of a fluoropolymer material.

Groff in U.S. Pat. No. 4,145,175 discloses an extrusion apparatus for polyethylene operating at 350°–500° F. It uses a short stroke reciprocating punch as the ram to extrude polyethylene powder at a draw ratio of 1:1.

Murray in U.S. Pat. No. 3,954,372 discloses a device for the ram extrusion of polymer powders using a short stroke reciprocating ram. This patent is silent on temperature and draw ratios. This disclosure is for the extrusion of powders, not billets, by a reciprocating punch, and not a long stroke ram.

Cottington in U.S. Pat. No. 3,887,319 also discloses an apparatus for the extrusion of polymers, where a reciprocating short stroke ram is used to extrude granules of polymer, at room temperature at a maximum rate of 12.5 cm/min. with a draw ratio of 3:1.

All of these prior systems suffer from problems of very low rates of production and the ability to produce products of only small cross-sectional area, and provide little or no enhancement in properties through molecular orientation.

SUMMARY OF THE INVENTION

It is an object of the present invention to modify the solid state extrusion process and other solid state deformation processes such that they can be used to produce oriented polymer profiles with tensile strength and modulus greater than that of the starting material (preferably about 5-30 times greater than that of the starting material), while producing profiles of cross-sectional areas greater than 0.5 cm² at high extrusion rates above 50 cm/min.

In accordance with one aspect of the invention, in a solid state deforming process a thermoplastic polymer, preferably a semi-crystalline polymer shape, is deformed, preferably by being forced through a die, to form a highly oriented polymer shape. The process includes the steps of providing a deformation area, such as a die, for producing a polymer profile with a cross-sectional area greater than 0.5 cm², heating the polymer shape to a temperature below the melting point of the polymer, and heating the deformation area, such as a die, to a temperature at least about as high as the temperature of the polymer shape. The polymer shape is deformed, as by extrusion through a pressure chamber and a deformation area, such as a die, at a rate greater than 50 cm/min. and a deformation ratio of greater than 5. A haul-off stress is applied to the oriented polymer profile between at least 0.5 MPa and a maximum amount without plastically deforming the profile as it leaves the deformation area.

Other advantages and aspects of the present invention will be apparent from the following detailed description of the invention by reference to the drawings wherein like reference numerals refer to like elements in the several figures.

DESCRIPTION OF THE PREFERRED EMBODIMENTS

Figure 1:
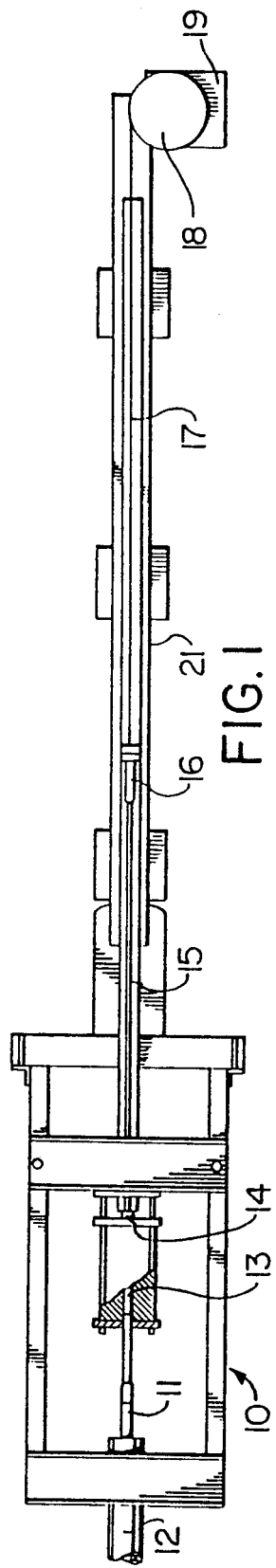
FIG. 1 is a plan view of an extrusion apparatus according to the invention.

According to the present invention, it has been discovered that production rates in the solid state deformation, e.g., ram extrusion, of thermoplastic polymers shapes, e.g., semi-crystalline polymer billets, can be significantly increased, even when making profiles of cross-sectional areas greater than 0.5 cm², by special control of the temperatures of the polymer and the die, in combination with special control of haul off stress on the extrudate. The pressure or extrusion chamber containing the polymer and the die are separately heated, with the die preferably but not necessarily being maintained at a temperature above that of the polymer. These temperatures are such that the polymer is softened but essentially still solid during the extrusion process.

Thus, the invention in its broadest aspect relates to a solid state deformation process in which a thermoplastic polymer shape, preferably of a semi-crystalline material, is deformed to create an oriented polymer shape, preferably a highly oriented polymer shape. Most preferably, a semi-crystalline polymer shape is placed in a pressure chamber and is forced by a ram from the pressure chamber through a die at the end of the chamber. The polymer passes through the die at a temperature ranging between as much as 30° C. below the alpha-crystalline temperature and the melting point of the polymer, forming an oriented polymer profile. According to the invention, the billet in the pressure chamber is maintained at a temperature about 0.50-0.95 times the melting point of the polymer in degrees Celsius. That is, for a polymer having a melting point of 130° C., the pressure chamber is maintained at about 65° to 124° C. The die is heated to above 0.50 times the melting point of the polymer or preferably above 0.65 times the melting point of the polymer. Most preferably the die is about 0.65-1.2 times the melting point of the polymer, with the die being at least 5° C. warmer than the polymer. The haul off stress on the extrudate or deformed polymer is maintained between at least 0.5 MPa and the maximum amount possible without plastic deformation. These and other temperatures used herein refer to the temperature of the pressure chamber and the temperature of the die themselves. These temperatures do not take into account the internal increases in temperature that may be caused within the polymer shape as a result of deformation forces upon it. These procedures make possible the production of a highly oriented profile having a cross-sectional area of greater than 0.5 cm² at a production (extrusion) rate greater than 50 cm/min, e.g., 200 to 500 cm/min. at high deformation ratios. The invention is particularly advantageous for the production of profiles with cross-sectional areas greater than 100 cm² at production rates greater than 100 cm/min.

Deformation ratio, as used herein, means the ratio of the cross-sectional area of the polymer shape before deformation to the cross sectional area of the polymer after deformation and orientation. In the processes of this invention deformation ratios of 5 to 30 are preferable, with those in the range above 8 being more preferred, and those in the range above 10 being most preferred. These ratios of 8 to 10 and above are high deformation ratios in polymers such as polyethylene, which means that the polymer has become highly oriented as a result of deformation.

As used herein, "highly oriented" refers to the morphology of a polymer shape. As explained above, polymer shapes after cooling from the molten state have spherulitic morphology. After substantial deformation in the solid state, these shapes have a fibrillar morphology. Fibrillar morphology differs from "fibrillation", which refers to a kind of material failure. Fibrillar morphology in the case of polyethylene the molecular weights used in the examples of this application begins to appear at a draw ratio of about 5, at which point the polymer begins to become oriented. Fibrillar morphology is obtained in polyethylene of the molecular weights of the examples herein at draw ratios of 8 to 10 and above. Polymer shapes with such a non-spherulitic, or a fibrillar, morphology are called "highly oriented".

This high degree of orientation causes the polymer to become stronger and stiffer relative to its randomly oriented state, as is present after solidification from the melted state. The stronger and stiffer nature of the highly oriented polymer makes it difficult to extrude at high rates. The extrusion ratio required to achieve a highly oriented polymer will vary with the particular polymer involved and its molecular weight. The present invention is preferably used to obtain highly oriented polymers of large cross section at high extrusion rates. For polyethylene, polypropylene and many other polymers of this invention an oriented polymer is obtained beginning at a deformation ratio of greater than 5, or preferably greater than 8, and most preferably greater than 10.

The temperature of the pressure chamber holding the polymer and the temperature of the die are about the same in one embodiment of the invention. A preferred embodiment of the invention, however, maintains the die temperature at least 5° C. warmer than the billet temperature. Both embodiments produce an oriented profile with the disclosed cross-sectional area at an extrusion rate greater than 0.5 m/min.

The invention is particularly advantageous for the production of profiles with cross-sectional areas greater than 1 cm² at production rates greater than 1 m/min.

The polymer is preferably heated in an external oven to a temperature 0.7–0.9 times the melting point of the polymer in degrees Celsius and the billet is inserted into the pressure chamber, which typically is controlled at a temperature the same as or slightly hotter than the polymer temperature.

The process of the invention is generally applicable to thermoplastic polymers in which orientation of the molecules can be induced by solid state deformation. This process is particularly useful for producing solid state extrusions of semi-crystalline polymers that allow themselves to be highly oriented at high draw ratios to produce profiles with increased stiffness and strength. Substantially linear polymers are preferred, that is polymers in which chain branching occurs in less than in 1 per 1000 polymer units. Polyethylene and polypropylene are particularly suitable for treatment by the inventive process, but other polymers including fluorinated and oxygen substituted hydrocarbon polymers, can also be treated in a very satisfactory way. Examples of such polymers include polypropylene, polyethylene, polymethylpentane, polytetrafluorethylene, e.g. TEFLON ®, polyamides such as NYLON ®, polyesters such as polyethylene terephthalates (DACRON ®, TERYLENE ®), polyethylene oxide, polyoxymethylene, liquid crystal polymers such as VECTRA ®, etc.

The haul off stress can be applied by known means, e.g., a cable and power driven reel. The stress is used to obtain smooth stable polymer flow from the die, to provide straight profiles and to prevent slip-stick motion. Preferably the stress is the maximum permissible without plastic drawing or deformation of the profile. Typically, this stress is in the range of 1 to 20 MPa.

As mentioned above, the prior art had found the rate of solid state extrusion of thermoplastic polymers, such as semi-crystalline polymers, to be very slow (Bigg article at p. 834). Previous attempts to extrude at high rates resulted in process instabilities. High pressures at high draw ratios (12 to 17 for high density polyethylene) had reached a point of diminishing returns.

Without being bound to any theory of operation, the present invention may be explainable in terms of two forces which must be overcome to produce an oriented profile by extrusion. The first force is the force due to friction, which is the force necessary to overcome the friction of the polymer against the die and is approximately proportional to the external surface area of the polymer profile. The pressure due to friction (force per unit area) is therefore inversely proportional to the diameter in the die. The second force is the force due to orientation, which is the force necessary to orient the molecular chains in the polymer and is approximately proportional to the cross-sectional area of the polymer in the die. The pressure due to orientation is therefore approximately independent of the diameter of the die. If these relationships are correct, it may be that extrusion or deformation rates based on small diameter extrusions should not be extrapolated, as many in the art apparently have done, to large diameter extrusions. At small diameters, the pressure due to friction is high and prevents high extrusion rates, but at large diameters, it may be that the pressure due to friction becomes less of a factor, while pressure due to orientation changes little if at all, thus permitting higher extrusion rates than expected. Another explanation may be that in prior art small diameter solid state extrusion processes, heat created by the work and deformation of extrusion was dissipated at a different rate and with a different effect than in large diameter extrusion processes.

A die used in the present invention preferably includes a tapered section about 15–30 cm. long, usually with an angle of taper between 10° and 40°, and a land portion at the outlet end about 2 to 4 cm long in which no plastic deformation of the polymer takes place. The opening at the outlet end will have a diameter or maximum width of about 2 to 5 cm, giving a die length to outlet opening ratio of about 3 to 30, with 5 to 20 being preferred. It is usually preferred to give the land portion a polished smooth surface, and polishing the entire inner surface of the die is also preferable. The die land may be heated separately from the die and may, if desired, be held at a different temperature from the die. However, the die and land are normally held at approximately the same temperature.

The heating of the pressure chamber and the die can conveniently be done by means of electric band heaters surrounding the pressure chamber and die. Thermocouples sense the actual temperature of the pressure chamber and die and adjust controllers for the band heaters accordingly. If desired, a separate band heater and thermocouple may be provided for the die land.

According to another embodiment, the heating may be done by circulating a heat exchange fluid through the interior of the chamber walls and the die walls.

With the process of this invention, it is possible to produce profiles having cross-sectional areas to up to 100 cm² at production rates up to 10 m/min. These profiles can vary widely in configuration, e.g. cylindrical, I-beam, C-channel, L-shaped, rectangular, square, hollow cylinder, etc.

Figure 2:
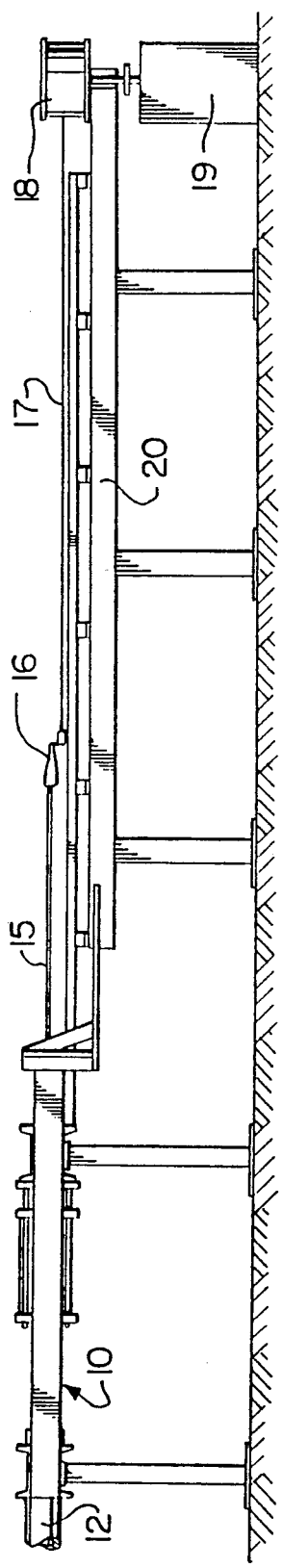
FIG. 2 is a side view of the device of FIG. 1.

The device shown in FIGS. 1 and 2 is a typical 100 tonne capacity extrusion press, consisting of a ram extruder section 10 and a haul off bench 20. The ram extruder comprises a pressure chamber 13 into which extends a ram 11 driven by a hydraulic cylinder 12. The pressure chamber 13 connects to a die 14, the outlet of which connects to a runout table 21.

The extrudate 15 is connected to a gripper 16 whereby haul off stress is supplied by means of cable 17 connected to spool 18 and motor 19.

In the particular device used in the examples, the working area of the ram 11 is 78 cm² and a maximum pressure of 128 MPa can be applied to the ram. This provides a pressure equal to a nominal 100 tonnes of pressure.

Figure 3:
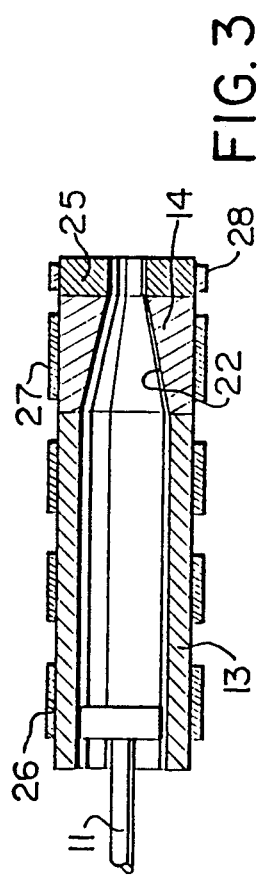
FIG. 3 is a sectional view of an extrusion chamber and die according to the invention.

The actual die itself can be seen from FIG. 3. Thus, it will be noted that the die 14 has a tapered portion 22 and a land section 25. The die is tapered at an angle of 15°, in order to produce a uniform streamlined flow. The pressure chamber 13 is surrounded by band heaters 26 and the die portion 14 is surrounded by separate band heaters 27. The land portion 25 is heated by band heater 28.

Certain preferred embodiments of the invention and comparisons with known processes are shown in the following non-limiting examples.

EXAMPLE 1

A round rod profile was produced from a cylindrical billet of DuPont 2909 polyethylene (average molecular weight of 55,000) having a diameter of 10 cm and a length of 35 cm using the apparatus illustrated in FIGS. 1-3 equipped with a die such that the final diameter of the rod was 2.5 cm, corresponding to a draw ratio of 16.0. The billet temperature was 115° C. and the die temperature was 132° C.

The extruded output rate was 1.5 m/minute. In most cases a lubricant consisting of a silicone fluid was applied to the billet prior to extrusion. A haul off tension was applied by the extrudate by a loading of 125 kg. This applied stress did not result in any change in cross sectional diameter of the extrudate, which had the same diameter as the die land. Hence there was no drawing of the profile after exiting the die. The haul off stress had a four-fold purpose: (1) to keep the profile running straight as it exited the die land; (2) to prevent slip-stick motion; (3) to maintain extrudate properties, i.e., up to 40% of tensile modulus and strength can be lost due to elastic recovery if no stress is applied to the extrudate; and (4) to maintain the dimension within narrow tolerances.

Extrudates prepared in these experiments had a smooth even surface, with no evidence of slip-stick surface irregularities, a modulus of 9.4 GPa, depending upon exact processing conditions and draw ratio. The starting material had a modulus of 0.6-0.7 GPa. Thus increases in modulus up to 15 fold were achieved. The diameter of the rod was within ±2% of the diameter of the die land.

EXAMPLE 2

An I-beam profile was produced, using the same polymer billet material and apparatus as in Example 1, at a draw ratio of 27. This produced an I-beam of 5.0 cm in width, 2.5 cm in depth with a flange and web thickness of 3.0 mm. The billet temperature was 120° C. and the die temperature 150° C. A haul off loading of about 40 kg was applied to the extrudate. The extrudate output rate was 0.5 m/minute. The flange of the I-beam had a modulus of 19-20 GPa and the web 13-17 GPa.

EXAMPLE 3 (COMPARATIVE)

A rectangular profile 3.6×0.3 cm, using the same polymer billet material and apparatus as in Example 1, was produced at a rate of 1.3 m/minute. The billet temperature was 80° C. with a die temperature set at 120° C. No haul off stress was applied for this experiment. The modulus was 23.8 GPa and the strength was 215 MPa. Due to a lack of haul off stress, the product was curved, had an uneven surface and an unacceptable variation in diameter.

EXAMPLE 4

A channel section, 8.4 cm wide, 3 cm deep and 5 mm thick, was produced, using the same polymer billet material and apparatus as in Example 1, at a draw ratio of 13. The billet temperature was 110° C. and the die temperature was 140° C. A haul-off load of 120 kg was applied to the extrudate. The output rate was 1.2 m/minute. The flange of the channel had a modulus of 17.9 GPa and the web had a modulus of 11.2 GPa.

EXAMPLE 5

Again using the same billet material and apparatus as in Examples 1-4, an identical extrusion was carried out with and without a silicone lubricant. The operation conditions and results are shown in the following table:

| | |
|---|---|
| Profile | 2.8 cm diameter rod |
| Draw Ratio | 13 |
| Billet Temperature | 90° C. |
| Die Temperature | 132° C. |
| Modulus of Profile Without Using Lubricant | 9.9 GPa |
| Modules of Profile Using Lubricant | 9.7 GPa |
| Peak Force in Ram Without Lubricant | 105,493 KPA |
| Peak Force in Ram With Lubricant | 82,395 KPA |

The above test shows that by using the lubricant, the force required to produce an oriented polyethylene extrudate can be reduced by 22% without any significant loss of stiffness. The use of the lubricant improved the appearance of the surface and reduced the roughness.

EXAMPLE 6

Using the same apparatus as in the above examples, a billet of Shell 6100 polypropylene having a diameter of 10 cm and a length of 35 cm was used to produce an L-shaped profile 5.0×5.0×0.6 cm at a draw ratio of 13.3. The die temperature was 220° C. and the billet temperature was 160° C. and the extrusion rate was 1.2 m/min. A straight, smooth profile was produced having a modulus ten times greater than that of the starting material.

EXAMPLE 7

A flat bar shape profile was produced using a die with a draw ratio of 7.89. A high molecular weight polyethylene Dupont 16A (average molecular weight 200,000) was used as the billet material. The billet temperature was 100° C. and the die temperature was 110° C. The profile had a modulus of 4.66 GPa when a haul-off tension was applied. A run without applying the haul-off tension was conducted and resulted in the profile having a modulus of 2.93 GPa.

EXAMPLE 8

An angular profile was produced from a cylindrical billet of Dupont 2909 polyethylene. The draw ratio of the die is approximately 14. The billet and the die were both heated to a temperature of 100° C. and a haul-off tension of 200 lbs was applied to the extrudate. The tensile modulus of the extruded profile was 16.83 GPa.

Although specific embodiments of the present invention have been described above in detail, it will be understood that this description is merely for purposes of understanding the present invention. Modifications of the preferred embodiments described herein may be made by those skilled in the art without departing from the scope of the present invention which is set forth in the following claims.

I claim:

1. A solid state extrusion process in which a semi-crystalline polymer billet in a pressure chamber is forced through a die to form a highly oriented polymer profile, comprising the steps of:
- selecting a semi-crystalline polymer billet with a cross sectional area greater than a cross sectional area of the die;
- providing a die for producing a polymer profile with a cross-sectional area greater than 0.5 cm$^2$;
- heating the pressure chamber to a temperature below the melting point of the polymer;
- heating the die to a temperature below the melting point of the polymer;
- extruding the polymer billet through the pressure chamber and die to create a highly oriented polymer profile at an extrusion rate greater than 50 cm/min.; and
- applying a haul-off stress to the highly oriented polymer profile between at least 0.5 MPa and a maximum amount without plastically deforming the profile as it is being extruded.

2. A solid state extrusion process as set forth in claim 1, further comprising the step of heating the die to a temperature at least about as high as the temperature of the pressure chamber.

3. A solid state extrusion process as set forth in claim 1, further comprising the step of heating the pressure chamber to a temperature between 0.50–0.95 times the melting point of the polymer billet.

4. A solid state extrusion process as set forth in claim 1, further comprising the step of heating the die to a temperature of at least 0.65 times the melting point of the polymer billet.

5. A solid state extrusion process as set forth in claim 1, further comprising the step of maintaining the pressure chamber and die temperature at the same temperature.

6. A solid state extrusion process as set forth in claim 1, wherein the die includes a land portion and further comprising the step of heating the land portion separately from the die.

7. A solid state extrusion process as set forth in claim 1, further comprising the steps of:
- providing a die for producing a polymer profile with a cross-sectional area greater than 1 cm$^2$; and
- extruding the polymer billet through the die at an extrusion rate greater than 1 m/min.

8. A solid state extrusion process as set forth in claim 1, further comprising the step of providing a die with a length to outlet opening ratio of between 5 and 30.

9. A solid state extrusion process as set forth in claim 1, further comprising the step of providing a die with an angle of taper between 10° and 40°.

10. A solid state deformation process in which a thermoplastic rigid polymer shape is deformed to form a highly oriented polymer shape, comprising the steps of:
- selecting a first thermoplastic rigid polymer shape with a cross-sectional area greater than the cross-sectional area of the oriented polymer shape;
- providing a deforming area for producing an oriented polymer shape with a cross-sectional area greater than 0.5 cm$^2$;
- heating the first thermoplastic rigid polymer shape to a temperature below the melting point of the polymer shape;
- heating the deforming area to a temperature below the melting point of the polymer shape;
- extruding the first thermoplastic rigid polymer shape at a rate greater than 50 cm/min to form a highly oriented polymer shape; and
- applying a haul-off stress to the highly oriented polymer shape of between at least 0.5 MPa and a maximum amount without deforming the profile as it is extruded.

11. A solid state deformation process as set forth in claim 10, further comprising the step of heating the deforming area to a temperature at least about as high as the temperature to which the first thermoplastic rigid polymer shape is heated.

12. A solid state deformation process as set forth in claim 10, further comprising the step of heating the first thermoplastic rigid polymer shape to a temperature between 0.50 and 0.95 times its melting point.

13. A solid state deformation process as set forth in claim 10, further comprising the step of heating the deforming area to a temperature of at least 0.65 times the melting point of the first thermoplastic rigid polymer shape.

14. A process for forming a highly oriented polymer shape, comprising the steps of:
- selecting a thermoplastic rigid polymer initial shape with a cross-sectional area greater than the cross-sectional area of the highly oriented polymer shape to be produced;
- providing a deforming area having a cross-sectional area greater than 0.5 cm$^2$ but sufficiently smaller than the thermoplastic rigid polymer initial shape to provide a highly oriented polymer shape;
- heating the thermoplastic rigid polymer initial shape and the deforming area to a temperature below the melting point of the polymer shape;
- extruding the thermoplastic rigid polymer initial shape through the deforming area to produce the highly oriented polymer shape at a rate greater than 50 cm/min; and
- applying a haul-off stress to the highly oriented polymer shape as it leaves the deforming area, said stress being applied in an amount between at least 0.5 MPa and a maximum amount without plastically deforming the highly oriented polymer shape.

15. The process of claim 14 in which a deformation ratio of the thermoplastic rigid polymer initial shape to the oriented polymer shape is greater than 5.

16. The process of claim 15 in which the deformation ratio is between 5 and 30.

17. The process of claim 16 in which the polymer is polyethylene or polypropylene.

18. The process of claim 14 in which the deforming area is a die.

19. The process of claim 14 in which the rate referred to is greater than 200 cm/min.

* * * * *